United States Patent [19]

Taillebois et al.

[11] Patent Number: 4,769,537
[45] Date of Patent: Sep. 6, 1988

[54] ANALOG POSITION-INDICATING OPTICAL ENCODER

[75] Inventors: Jacques Taillebois, Plaisir; Jean-Claude Perrot, Montigny les Cormeilles; Paul Gambs, Ecully; Jean-Farie Renaud, Courbevoie, all of France

[73] Assignee: M.C.B., Courbevoie, France

[21] Appl. No.: 924,325

[22] Filed: Oct. 29, 1986

[30] Foreign Application Priority Data

Oct. 29, 1985 [FR] France ................................ 85 16053

[51] Int. Cl.$^4$ ............................................. G01D 5/34
[52] U.S. Cl. ........................... 250/231 SE; 250/237 G; 341/14
[58] Field of Search ...................... 250/231 SE, 237 G; 340/347 P; 356/373–375

[56] References Cited

U.S. PATENT DOCUMENTS 3,963,351 6/1976 Chance et al. ................ 250/231 SE
4,334,152 6/1982 Dakin et al. .................. 250/231 SE
4,536,649 8/1985 Kozai et al. ...................... 340/347 P

FOREIGN PATENT DOCUMENTS 0052911 4/1980 Japan ............................ 250/231 SE Primary Examiner—Edward P. Westin
Assistant Examiner—Khaled Shami
Attorney, Agent, or Firm—Antonelli, Terry & Wands

[57] ABSTRACT

An analog position indicating optical encoder is provided including: an element (1) with a band (2) having a transparency which substantially is complete with respect to two wavelengths ($1_1$ and $1_2$) but varies as a function of the angular or linear distance for a third wavelength ($1_3$) at wavelength which is between the above-said two wavelengths ($1_1$ and $1_2$); light emitting means ($3_1, 3_2, 3_3$) emitting three light beams ($7_1, 7_2, 7_3$) at the above said wavelengths ($1_1, 1_2, 1_3$); a first optical coupler (5,6) mixing the beams ($7_1, 7_2, 7_3$); optical bidirectional transmission means of the optical fiber type (B); a second optical coupler (18,19) dividing into three beams ($20_1, 20_2, 20'_3$) the light leaving the means (B) after being reflected by the optical element (13) and after passing through the band (2); three readers ($23_1, 23_2, 23_3$) responsive to the wavelength ($1_1, 1_2,$ and $1_3$); and an electronic unit (25) connected to the optical readers ($23_1, 23_2$), and determining the ratio between the mean readers reading the wavelengths $1_1$ and $1_2$ corresponding to the wavelength $1_3$ the responses of $23_1$ and $23_2$ and the response of $23_3$.

19 Claims, 1 Drawing Sheet

ANALOG POSITION-INDICATING OPTICAL ENCODER

The present invention relates to optical encoder for indicating, by diascopy, the position of a mobile element.

Position indicating optical encoder are primarily of the digital type and it is known that an encoder of this type includes, on the one hand, a disc or strip having several tracks, each with a succession of alternating narrow opaque and transparent zones and, on the other hand, a reading unit including, inter alia, a light source and one or more photodetectors which detect, for each track, if it is an opaque zone or a transparent zone which is present in front of the photodetector or photodetectors; the disc or strip and the reading assembly, are in relative motion with respect to each other, i.e. either in rotation (in the case of the disc) or in translation (in the case of the strip). In addition, an electronic unit for processing the signals emitted by the photodetector or photodetectors may cooperate with the photodetectors.

The present invention on the contrary relates to position locating optical encoders of the analog type, in which the disc or strip no longer has several tracks each having a succession of alternating narrow opaque and transparent zones, but a circular or linear band the transparency of which, with respect to a given wavelength, varies as a function of the angular or linear position from an origin, whereas reading is provided by means of one or more photodetectors in relative motion with respect to said disc or strip, which detect the intensity of the light transmitted or reflected by a zone of this band facing this or these photodetectors.

The above-mentioned means of an optical encoder, of digital or analog type, is disposed in a reduced volume or else, when these means are distant from each other, conductors (wires) provide for the electric connections, particularly between the energy supply means, the opto-electronic system forming the reading unit and the electronic signal processing unit.

In some applications there exists a substantial distance between the reading unit and the electronic signal processing unit. Any electric connection between these two units should be avoided because such a connection could be disturbed or adversely affected by clutter or interference, particularly in the case of analog transmission of signals between the reading unit and the electronic signal processing unit.

The present invention provides then an analog optical encoder for indicating, by diascopy, that is to say by transparency, the position of a mobile element distant from the electronic unit processing the signals which represent this position, while avoiding any clutter or interference.

In accordance with the invention, a position indicating encoder of the analog type comprises three parts or sub-units, namely: a data pick-up which cooperates with a position indicating code carrying element; an opto-electronic module with an electronic signal processing unit; and optical bidirectional transmission means of the optical fiber type between the pick-up and the module, said transmission means having a first and a second end; and wherein:

the code carrying element (disc or strip) includes a band whose transparency is substantially complete with respect to at least one wavelength, but varies as a function of the distance (angular or linear) from an origin, for another wavelength.

The opto-electronic module includes: opto-electronic light emitting means, adapted for emitting at least two light beams; one being of said at least one wavelength and another of said other wavelength; opto-electronic reading means, with optical filters, responsive to these wave lengths cooperates with the electronic processing unit so that said processing unit processes the electric signals emitted by the opto-electronic reading means; means for supplying said opto-electronic emitting means with electric energy; two optical couplers, the first coupler combining the light beams emitted by the opto-electronic emitting means and directing the combined beams towards said first end of the optical bidirectional transmission means of the optical fiber type, whereas the second coupler divides into at least two beams the light leaving said first end and directs these beams towards said opto-electronic reading means.

The pick-up includes an optical return element, with its input face disposed on the side of the code carrying element opposite that which is directed towards said second end of the optical bidirectional transmission means and with its output face directed towards said second end of the optical bidirectional transmission means; and the electronic signal processing unit is such that it calculates, for each position reading, the ratio between at least one response of said opto-electronic reading means for said at least one wavelength and the response of said opto-electronic reading means for said other wavelength.

An encoder according to the invention further includes one or more of the following advantageous features:

said at least one wavelength includes first and second wavelength, one larger and the other smaller than said other wavelength, and the opto-electronic light emitting means emit three light beams at the three above-mentioned wavelengths; the first coupler allows these three light beams to be mixed, the second coupler allows the light leaving said first end to be divided into three beams and said electronic unit is adapted to calculate, for each position reading, the ratio between the mean of the responses of said opto-electronic reading means for the first and the second wavelengths, on the one hand, and the response of said opto-electronic reading means for said other wavelength, on the other hand;

the optical bidirectional transmission means include at least two distinct optical fibers, the first disposed so as to transmit the light from the first optical coupler to the code carrying element and the second disposed so as to transmit the light from the output face of the optical return element to the second optical coupler;

the encoder further includes an optical system providing optical coupling between the output face of the first optical fiber and the input face of the second optical fiber;

each of the optical couplers consist of two semitransparent mirrors each having, at the effective incidence angle, a maximum reflection for one of said three wavelengths—different for the two mirrors of a coupler—and a maximum transmission for the remaining two of said wavelengths;

the encoder further includes three optical condensers, each disposed in the path of one of the three optical beams between the opto-electronic emitting means and the first optical coupler so that the two mirrors of this first optical coupler receive these three beams as substantially parallel rays;

the encoder further includes an optical system disposed between the output face of the bidirectional optical transmission means and the second optical coupler for focusing the light coming from this output face so that the two mirrors of this second coupler receive this light in the form of substantially parallel rays;

said opto-electronic light emitting means include at least two opto-electronic emitters, each emitting light beams at said at least one and said other above-mentioned wavelengths; alternatively, said opto-electronic light emitting means are constituted by a single opto-electronic light emitter, emitting light in a wide wavelength band including said at least one and said other wavelengths and at least two optical filters selecting said wavelengths;

said opto-electronic reading means, with optical filters, include at least two opto-electronic readers and at least two optical filters for respectively selecting one of the wavelengths, one of these filters being disposed in front of each of the opto-electronic readers;

the encoder further includes an optical system disposed between the first optical coupler and the optical bidirectional transmission means for focusing all of the optical beams reflected by this first coupler on the first end of the transmission means;

the coder further includes an optical system disposed between the second optical coupler and the opto-electronic reading means for focusing the light beams on said opto-electronic reading means.

The invention will be better understood from the detailed description which follows with reference to the accompanying drawings, the detailed description and drawings are included solely for purposes of illustration.

DESCRIPTION OF THE PREFERRED EMBODIMENTS

The detailed description which follows is illustrative of a preferred embodiment insofar as applicable to indicating an angular position, the coded carrying member rotates about the axis X—X axis carrying, locked therewith in rotation, a coded disc 1 with a band 2 coded in analog mode in the following way: the transparency of this band 2 is substantially complete for a first wavelength $l_1$ and for a second wave length $l_2$ whereas its transparency varies, for a third wavelength, $l_3$ between $l_1$ and $l_2$, continually or periodically depending on the angular distance from an origin or reference position.

Figure 1:
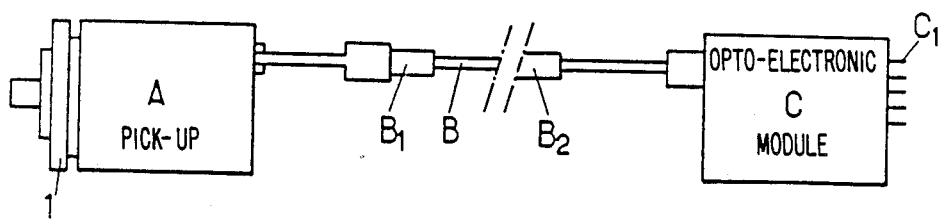
FIG. 1 illustrates schematically the assembly of and optical position-locating encoder according to the invention, showing its three constituent units, namely the pick-up means, the optical transmission means and the module.
Figure 2:
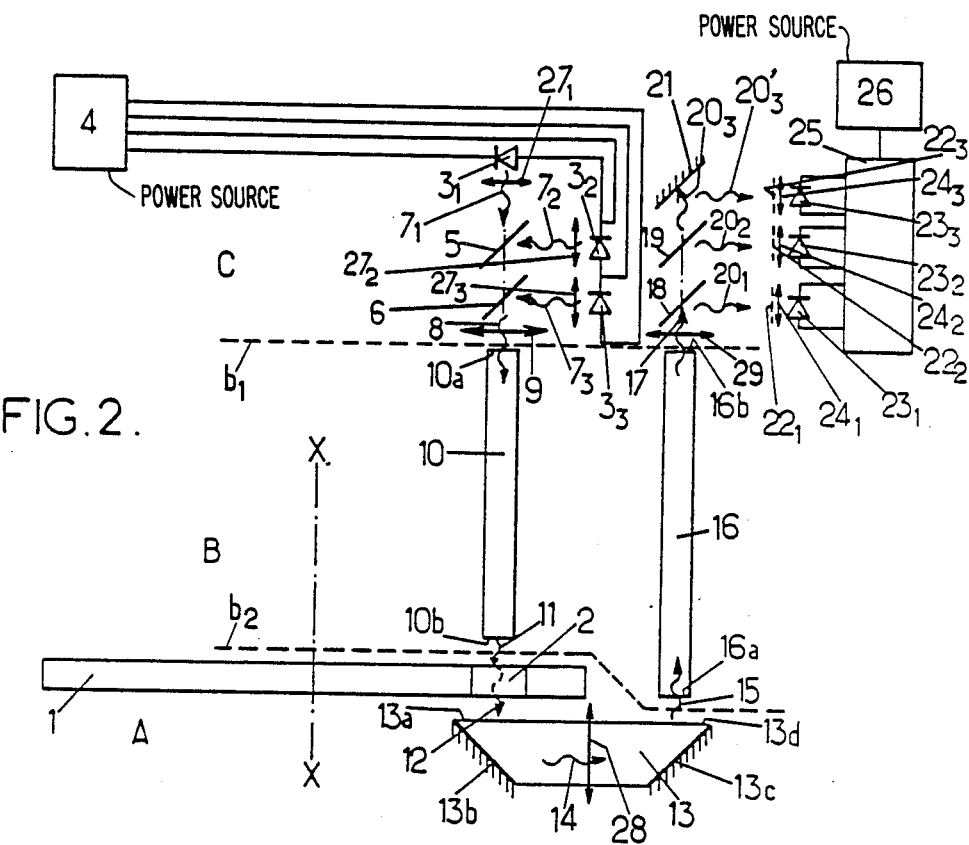
FIG. 2 shows the components of the three units illustrated in FIG. 1.

Referring more particularly to FIG. 2, the data pick-up or transducer A, the optical transmission system B with one or more optical fibers formed, for example, by an optical cable with one or more optical fibers, and the opto-electronic module C have been separated by broken lines (corresponding to units A, B and C in FIG. 1).

It can thus be seen that an encoder according to the invention essentially consist of:

three opto-electronic light emitters $3_1, 3_2, 3_3$, such as light-emitting diodes (LEDS), emitting light at wavelengths $l_1$, $l_2$ and $l_3$, wherein the wavelength $l_3$ is included between the wavelengths $l_1$ and $l_2$;

a power supply source 4 for the three light emitters $3_1$, $3_2$ and $3_3$;

three optical condensers $27_1, 27_2, 27_3$ focused on the opto-electronic emitters $3_1, 3_2, 3_3$ so as to form an image projected to infinity and to produce therefore beams $7_1, 7_2, 7_3$ of parallel rays at the three wavelengths $l_1, l_2, l_3$;

a first optical coupler formed, for example, by two semi-transparent mirrors 5 and 6, mirror 5 combining the optical beam $7_1$ emitted by the light emitter $3_1$, and the optical beam $7_2$ emitted by the light emitter $3_2$, whereas the mirror 6 mixing or combining these two beams with the optical beam $7_3$ emitted by the light emitter $3_3$; thereby resulting in an optical beam 8 containing the three wave lengths $l_1$, $l_2$, and $l_3$;

an optical system 9 disposed downstream of the first optical coupler semi-transparent mirrors 5 and 6 so as to focus the optical beam 8 on the input face 10a of an optical fiber (referenced hereafter) forming part of the bidirectional optical fiber optical transmission means B between pick-up A and module C;

a first optical fiber 10 whose input face 10a was mentioned above and whose output face 10b directs a transmitted optical beam 11 (at the wavelength $l_1$, $l_2$ and $l_3$) onto the band 2 of the coded disk 1, wherein the optical beam 12 penetrating therethrough and leaving this band 2; the light at wavelengths $l_1$ and $l_2$ is substantially not absorbed by the passage through band 2, whereas the light at wave length $l_3$ is absorbed as a function of an analog or pseudo analog relationship, i.e., the absorption depending on the angular distance between the zone of band 2 through which the light (beams 11–12) passes at that time and the origin of the angular distances;

an optically reflecting element 13, with input face 13a directed towards band 2, and which includes two reflecting faces 13b and 13c inclined at 45° with respect to the axis X X, which is also the axis of the light beam 12, producing firstly a beam 14 inside the optical element 13 and secondly a beam 15 leaving through its output face 13d;

a second optical fiber 16 which also forms part of the bidirectional optical fiber optical transmission means B between pick up A and module D, wherein the input face 16a of this optical fiber 16 receives beam 15 and the output face 16b of this fiber is traversed by the transmitted beam 17;

an optical system 28 providing the optical coupling between the output face 10b of the first optical fiber 10 and the input face 16a of the second optical fiber 16;

an optical system 29 is focused on the output face 16b of the optical fiber 16 so as to produce a beam 17 of rays parallel to the optical axis of fiber 16;

a second optical coupler formed, for example, by two semi-transparent mirrors 18 and 19, which derives, from the beam 17 of parallel rays, three light beams $20_1$, $20_2$ and $20_3$, the latter being reflected by a mirror 21 as beam $20'_3$;

three optical filters $22_1, 22_2$ and $22_3$ each disposed in the path of one of the light beams $20_1, 20_2$ and $20'_3$, respectively, only transmit light at the wavelengths $l_1$, $l_2$ and $l_3$;

three opto-electronic readers $23_1, 23_2, 23_3$ which are sensitive respectively to the three wave lengths $l_1, l_2$ and $l_3$;

advantageously three optical systems $24_1, 24_2, 24_3$ disposed in front of each opto-electronic reader $23_1, 23_2$ and $23_3$, respectively, for focusing the light on these readers;

an electronic signal processing unit 25 which calculates, for each position reading, the ratio between, on the one hand, the mean of the responses of the two opto-electronic readers $23_1$ and $23_2$, in front of which are placed the optical filters $22_1$ and $22_2$ selecting the wave length $l_1$ and $l_2$, respectively, and, on the other hand, the response of the opto-electronic reader $23_3$, in front of which is placed the filter $22_3$ which selects the wavelength $l_3$; and a unit 26 supplying the processing unit 25 with electric power, in practice, the electric power supply units 4 and 26 are combined in a single unit and it is only for the sake of simplifying the drawings that they have been separated.

As a modification, instead in place of the three opto-electronic emitters $3_1, 3_2, 3_3$, a single opto-electronic emitter could be utilized which emits a wide beam in a wide band of wave lengths including the three wave lengths $l_1, l_2$ and $l_3$, wherein three filters are utilized for selecting the three wave lengths $l_1, l_2$ and $l_3$ in the emission of this single opto-electronic emitter.

As a further modification, instead of providing two distinct optical fibers 10 and 16, a single optical fiber could be provided in the optical bidirectional transmission means B between pick-up A and module C, this single fiber transmitting the light in both directions and cooperating with return mirrors which would allow the face $b_2$ of the optical bidirectional transmission means B to be connected optically, on the one hand, with band 2 for transmitting thereto beam 11 and, on the other hand, to the output face 13d of the optical return element 13 for receiving beam 15 therefrom; and an optical bidirectional coupler disposed for optically connecting the face $b_1$ of the optical bidirectional transmission means B with, on the one hand, said first optical coupler having semi-transparent mirrors 5 and 6 for transmitting the optical output beam 8 of this first coupler to this face $b_1$ and, on the other hand, the second optical coupler having semi-transparent mirrors 18 and 19 for transmitting to this second coupler the optical beam 17 leaving this face $b_1$.

Figure 3:
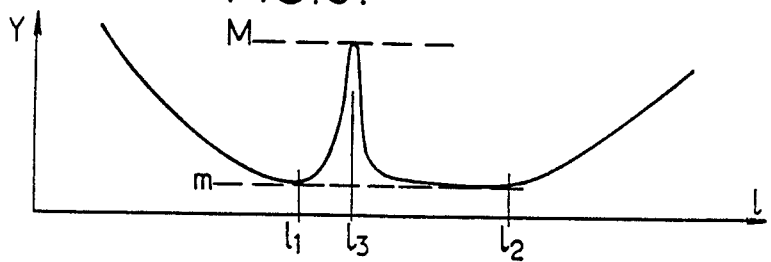
FIG. 3 illustrates the variation of the absorption of the variable transparency band of the code carrying element, as a function of wavelength.

FIG. 3 illustrates the variation of the optical absorption Y of band 2 as a function of the wave length l of light, formed by beam 11 which reaches it, the three particular wavelengths $l_1, l_2$ and $l_3$ from which beam 11 is formed being indicated along the abscissa and having the values 880, 1550 and 1300 nm respectively.

As can be seen, the optical absorption is very low or practically zero for the wavelengths $l_1$ and $l_2$ and it is high for the wavelength $l_3$; (the minimum absorption has been shown as m and the maximum absorption as M); the absorption further varies for this wavelength $l_3$ depending on the angular distance on the circular band 1 as a function of the distance to an origin.

Therefore, the wave lengths $l_1$ and $l_2$ of beam 11 are transmitted practically without absorption by band 2 and so the readers $23_1$ and $23_2$ receive light which has an intensity independent of the angular position of the coded disc 1 and its band 2; on the other hand, reader $23_3$ receives light of wave length $l_3$ with an intensity which is an analog or pseudo analog function of the angular distance of the reading position of disc 1, with its band 2, with respect to an origin.

The unit 25 for processing the signals emitted by the three readers $23_1, 23_2$ and $23_3$ calculates, as mentioned above, the ratio between, on the one hand, the mean of the responses $i_1$ of reader $23_1$ and $i_2$ of reader $23_2$ and, on the other hand, the response $i_3$ of the opto-electronic reader $23_3$, namely then $(i_1+i_2)/2i_3$ or inversely $2i_3/(i_1+i_2)$.

It is important to notice that the fluctuations of the losses in the system as a whole (variations of the power supply source 4, losses in the air and the optical fibers from the semi-transparent mirror 6 to the semi-transparent mirror 18, as well as in the return optical element 13, excluding of course absorption in band 2), for the wave lengths $l_1, l_2$ and $l_3$, disappear in the above mentioned ratio $(i_1+i_2)/2i_3$ or $2i_3/(i_1+i_2)$.

The use of three wave lengths, although requiring three emitters and three opto-electronic readers associated respectively with a first and a second optical coupler, each having two semi-transparent mirrors, allows the angular position of disc 1 to be determined, independently of the above mentioned fluctuations, which ensures the accuracy of the measurement of the angular position of disc 1 to be independent of fluctuations due to current, temperature or pressure variations.

With respect to FIG. 1 there has been shown:

the units of pick-up A, with the coded disk the optical cable B forming the optical fiber transmission means and the module C with its output C towards the means using the output signals from module C; and the connectors $B_1$ (with face $b_1$) and $B_2$ (with face $b_2$) of the optical cable B, respectively with pick up A and module C.

Thus, as a modification instead of providing three wavelengths $l_1, l_2, l_3$ two different wave lengths only, i.e. $l_1$ and $l_2$, could be used, while providing in this case only two opto-electronic emitters $3_1, 3_2$ the beams of which are mixed by a single semi-transparent mirror 6 (mirror 5 being omitted), by providing similarly a single beam separation mirror, namely mirror 18 (with omission of mirror 19), and finally by providing only two opto-electronic readers $23_1$ and $23_3$, preceded by filters $22_1$ and $22_3$, respectively, and optical systems $24_1$ and $24_3$, respectively (elements $23_2, 22_2$ and $24_2$ being omitted); in the case of using only two wavelengths, the electronic signal processing unit 25 calculates, for each position reading, the ratio between the response of the opto-electronic reader $23_3$ for the wavelength $l_3$ and the response of the opto-electronic reader $23_1$ for the wavelength $l_1$. While the invention has been described in terms of its preferred embodiments, numerous modifications may be made thereto without departing from the spirit and scope of the invention. It is intended that all such modifications fall within the scope of the appended claims.

We claim:

1. A position indicating encoder of the analog type, comprising: a data pick-up including a position-indicating code carrying element; an opto-electronic module including an electronic signal processing unit; and optical bidirectional transmission means of the optical fiber type disposed between said pick-up and said module and having a first end and a second end, wherein:

said code carrying element has two main sides and includes a coded band having a transparency which substantially completely transfers therethrough optical beams of at least one wavelength but which varies in transparency as a function of the angular or linear distance from a reference position for optical beams of another wavelength;

said opto-electronic module includes: opto-electronic light emitting means adapted for emitting at least two light beams, one light beam corresponding to said at least one wavelength and the other to said another wavelength, opto-electronic reading means having at least two optical filters for sensing and converting said light beam wavelengths into electrical signals for processing by said processing unit, means for supplying power to said opto-electronic emitting means, two optical couplers, a first of said optical couplers combining the light beams emitted by said opto-electronic emitting means and directing the combined beams toward said first end of said optical bidirectional transmission means whereas a second of said optical couplers is responsive to the light passing out of said first end and separates it into at least two beams and directs these beams towards said opto-electronic reading means;

said pick-up includes an optical return element having an input face and an output face, said input face being disposed on a side of said code carrying element opposite that which is directed towards said second end of said bidirectional transmission means and its output face being directioned towards said second end of said bidirectional transmission means for returning the light beams via said bidirectional transmission means; and said electronic signal processing unit calculates, for each position reading, the ratio between at least one response corresponding to said opto-electronic readings for light beams of said at least one wavelength and the readings corresponding to said another wavelength.

2. A position indicating encoder according to claims 1, wherein said at least one wavelength includes first and second wavelengths, said opto-electronic light emitting means emit three light beams corresponding to said first, second and said another wavelength, said first coupler combining these three light beams, said second coupler causes the returning light passing out of said first end of said bidirectional transmission means to be divided into three beams and said electronic unit is adapted to calculate, for each position reading, the ratio between the mean of the responses of said opto-electronic reading means corresponding to said first and said second wavelengths, on the one hand, and the response corresponding to said another wavelength, on the other hand.

3. A position indicating encoder according to claim 1, wherein the optical bidirectional transmission means includes at least two optical fibers each having an input face and an output face, a first of said optical fibers disposed for transmitting therethrough the light from said first optical coupler to said code carrying element and via said optical return element relaying it to said second optical coupler via the second of said optical fibers.

4. A position indicating encoder according to claim 3, further including an optical system means for coupling the output face of the first optical fiber and the input face of the second optical fiber.

5. A position indicating encoder according to claim 2, wherein each of said optical couplers include two semi-transparent mirrors each providing, at the effective incidence angle, a maximum reflection for one of said three wavelengths—different for the two mirrors of a coupler—and a maximum transmission for the other two said wavelengths.

6. A position indicating encoder according to claim 5, further including three optical condensors disposed in the path of the three optical beams, corresponding to said first, second and said another wavelength, between the opto-electronic emitting means and said first optical coupler so that the two mirrors of said first optical coupler receive these three beams in the form of substantially parallel rays.

7. A position indicating encoder according to claim 5, further including an optical system disposed between said output face of the optical bidirectional transmission means and said second optical coupler for focusing the light coming from said output face so that the two mirrors of said second coupler receive this light as substantially parallel rays.

8. A position indicating encoder according to claim 1, wherein said opto-electronic light emitting means include at least two opto-electronic emitters, each emitting one of the light beams at said at least one wavelength and at said another wavelength.

9. A position indicating encoder according to claim 1, wherein said opto-electronic light emitting means include a single opto-electronic light emitter emitting light in a frequency band of wavelengths including said at least one wavelength and said another wavelength, and at least two optical filters selecting said wavelengths.

10. A position indicating encoder according to claim 1, wherein said opto-electronic reading means with optical filters comprise least two opto-electronic readers and at least two optical filters each one for selecting one of said wavelengths, and each filter being disposed in front of each of the opto-electronic readers.

11. A position indicating encoder according to claim 1, further including an optical system, disposed between said first optical coupler and said optical bidirectional transmission means for focusing the optical beams reflected by said first coupler on said first end of said bidirectional transmission means.

12. A position indicating encoder according to claim 1, further including an optical system disposed between said second optical coupler and said opto-electronic reading means for focusing the light beams on said opto-electronic reading means.

13. A position indicating encoder according to claim 10, further including an optical system disposed between said second optical coupler and said two optical filters.

14. A position indicating encoder according to claim 1, wherein said light emitting means comprises at least one light-emitting diode (LED).

15. A position indicating encoder according to claim 2, wherein said light emitting means comprises three light-emitting diodes (LEDS).

16. A position indicating encoder according to claim 8, wherein said light emitting means comprises at least two light-emitting diodes (LEDS).

17. A position indicating encoder according to claim 1, wherein said optical return element comprises an optical reflector.

18. A position indicating encoder according to claim 1, wherein said code carrying element is constituted by an optical disc.

19. A position indicating encoder according to claim 18, wherein said coded band covers a ring-like area on said optical disc.

* * * * *